(No Model.)

J. P. WARNER.
SWIVEL COUPLING.

No. 276,203. Patented Apr. 24, 1883.

Attest.
John C. Perkins
R. B. Wheeler

Inventor.
Jasper P. Warner

UNITED STATES PATENT OFFICE.

JASPER P. WARNER, OF DOWAGIAC, MICHIGAN.

SWIVEL-COUPLING.

SPECIFICATION forming part of Letters Patent No. 276,203, dated April 24, 1883.

Application filed September 21, 1882. (No model.)

*To all whom it may concern:*

Be it known that I, JASPER P. WARNER, of the city of Dowagiac, county of Cass, and State of Michigan, have invented a certain Improvement in Swivel-Couplings, of which the following is a specification.

The object of my invention is to furnish a coupling for attaching harrows or cultivators to the frame-work of wheel-machines, known as "sulky" or "riding" machines, to make a cheap, durable, and simple coupling, and one that may be readily attached and cheaply repaired.

In order to aid others skilled in the art to which my invention belongs to make and use it, I will proceed to describe its construction and operations with reference to the several drawings, forming a part of this specification, in which—

Figure 1:
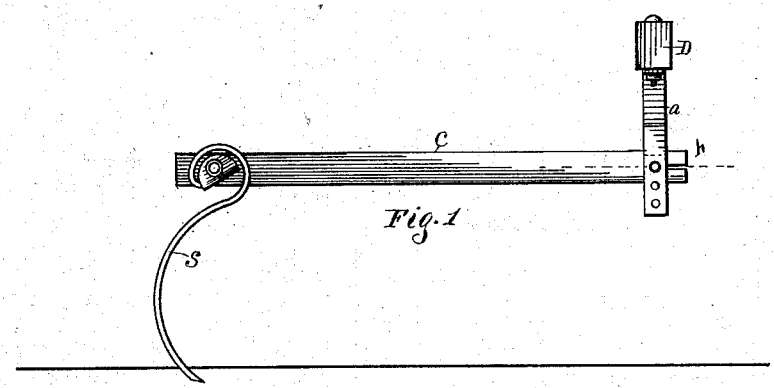
Figure 2:
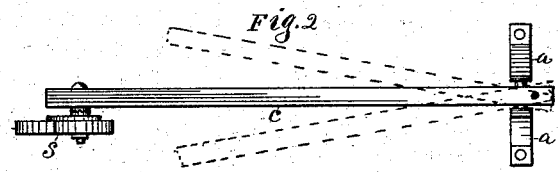
Figures 3, 4:
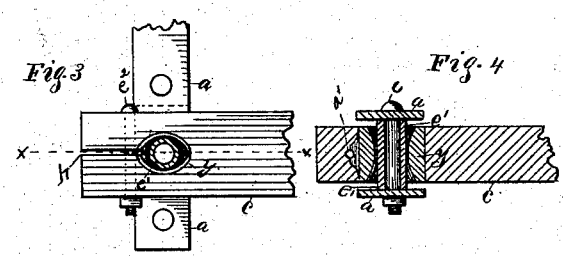
Figure 5:
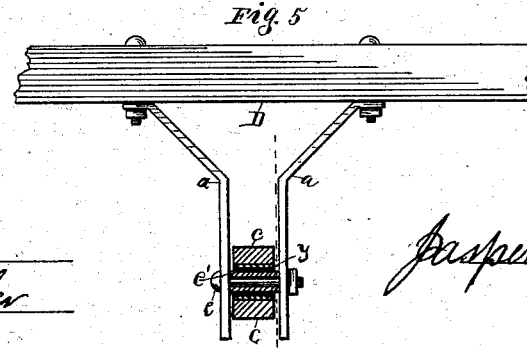

Figure 1 is a side elevation of a drag-bar attached by arms $a\ a$ to the sulky-frame D, also showing a harrow-tooth attached to the rear end of the beam C. Fig. 2 is a top plan view of the same detached from the frame D, in which dotted lines show the lateral movement of the beam C, which will be hereinafter described. Fig. 3 is an enlarged detached view of the front portion of Fig. 1, having one arm $a$ removed, also bolt $e$. Fig. 4 is a longitudinal sectional view of Fig. 3, through dotted line $x\ x$, showing bolt $e$ in position. Fig. 5 is a front end view of Fig. 1, and cross-sectional view of the beam C, box Y, and thimble $e'$, all of which will be hereinafter described.

Through the front end of beam C, I provide a hole sufficiently large to receive the metal box Y. (See Figs. 3 and 4.) The end of the beam is slotted at $h$, and passing through the beam perpendicularly is a bolt, $e^2$, which secures the box Y rigidly to the beam. The box is provided with a flange having a concavity, $a'$, (see Fig. 4,) through which the bolt $e^2$ passes, thus preventing the box Y from working endwise in the beam C. The box Y has a hole through the center. Said hole at each side of the box is elliptical in form, being round at the center of the box, and sufficiently large to receive the piping or thimble $e'$. (See Figs. 3 and 4.) This formation of hole admits of swinging the rear end of the beam C laterally, as shown by dotted lines of Fig. 2. This movement is very necessary, as in cultivating young plants the cultivator or spring teeth must be moved laterally to save young plants growing out of line with the row of plants. The thimble $e'$ is made of piping cut a little longer than the thickness through the beam C. (See Figs. 4 and 5.) Passing down from the beam D are two arms or braces, $a\ a$. Between these the beam C and thimble $e'$ are secured by the bolt $e$, passing through the braces $a\ a$ and thimble $e'$, and as the thimble is longer than the thickness through the beam the braces $a\ a$ may be rigidly bolted against the ends of the thimble, making a very solid fastening, and leaving the beam free to move upon the thimble $e'$ in a lateral manner, or to rock around it, as in raising or lowering the rear end of beam to draw from or insert into the ground the cultivator-teeth. By this arrangement of parts it is obvious that the bolt $e$ is released from all wear, the only part liable to wear being the thimble $e'$, which can be readily and cheaply replaced; and by this arrangement of parts a smaller bolt may be used than otherwise, as the thimble encircling it helps to strengthen it, and holds the braces $a\ a$ rigidly bound or braced, as shown in Fig. 5.

Fig. 3 shows a side elevation of the coupling, having one arm $a$ and the bolt $e$ removed from the thimble $e'$, showing the formation of the hole at one side of the box Y, also showing end view of the thimble $e'$ in its most natural position, while Fig. 4 shows by curved lines the general form of the hole through the box Y.

Having described my invention as fully as I can, what I claim as new and desire Letters Patent for is—

1. The combination of the beam C, having slot $h$, and containing box Y, having a flange with concavity $a'$ engaging with the bolt $e^2$, as and for the purposes specified.

2. In a swivel-coupling, the combination of the beam C, containing box Y, having an elliptical hole containing thimble $e'$ and bolt $e$, with braces $a\ a$, and beam D, when arranged and combined as and for the purposes specified.

JASPER P. WARNER.

Witnesses:
ROSCOE B. WHEELER,
CHARLES L. FOWLE.